O. R. BERGER.
COOKING UTENSIL.
APPLICATION FILED AUG. 21, 1915.
1,323,817.
Patented Dec. 2, 1919.
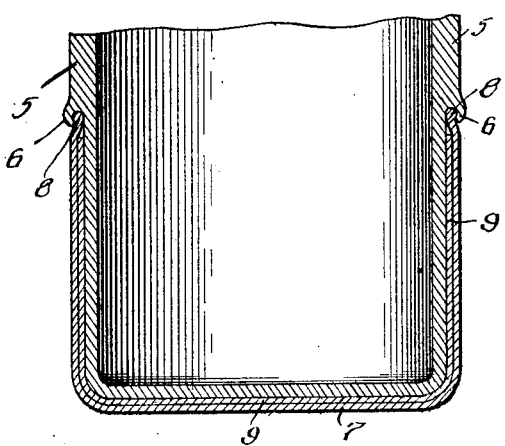
Witness:
R. L. Farrington
Inventor
Otto R. Berger,
By Brown Nissen & Pringle
Attys.

UNITED STATES PATENT OFFICE.

OTTO R. BERGER, OF CHICAGO, ILLINOIS.

COOKING UTENSIL.

1,323,817. Specification of Letters Patent. Patented Dec. 2, 1919.

Application filed August 21, 1915. Serial No. 46,615.

*To all whom it may concern:*

Be it known that I, OTTO R. BERGER, a subject of the Emperor of Germany, residing at Chicago, in the county of Cook and State of Illinois, have invented certain new and useful Improvements in Cooking Utensils, of which the following is a specification.

This invention relates to cooking utensils, and more particularly to the construction of the vessel itself by means of which any material cooked in the vessel may be prevented from burning, or in which the tendency for it to burn may be reduced.

For the attainment of these ends and the accomplishment of other new and useful objects as will appear, the invention consists in the features of novelty in the construction, combination and arrangement of the several parts generally shown in the accompanying drawing, and described in the specification, but more particularly pointed out in the claim.

The figure is a central vertical section of a cooking utensil with its top portion broken away.

In most cooking vessels there is a greater tendency for material to burn at the bottom of the vessel than on the sides, but if the vessel is placed over a flame or burner which extends around the sides, it is desirable to provide the sides with means for preventing a liquid from burning at that part of the vessel.

In the drawing the numeral 5 designates generally a cooking vessel constructed in accordance with my invention. Up on the side of the vessel at a substantial distance from the bottom is a projecting flange 6, and the material of the vessel below the flange 6 is somewhat thinner than the material above said flange, substantially as indicated. Disposed over the bottom of the vessel and extending up the sides to the flange 6 is a covering 7, preferably of metal, with its upper edge 8 thickened and held tightly by the flange 6 being formed closely around such part 8. Between the part 7 and the cooking vessel 5 is disposed a heat resisting or non-combustible member 9, which may be either in the form of a paste filling the entire space between member 7 and the vessel, or may be a sheet formed in proper shape to fill the space between members 5 and 7. The material answering these requirements is commonly known as mineral wool or asbestos.

With this construction it is obvious that any substances contained in the vessel will be prevented from burning on the bottom or sides of the vessel even though subjected to a very violent heat, for the reason that the bottom of the vessel proper cannot become any more heated than the non-combustible layer of material which is included between the outer plate and the vessel proper.

I claim:

A cooking utensil having an outwardly extending flange which divides the wall of the utensil into upper and lower portions of which the lower is thinner than the upper, a metallic member with a beaded edge which fits over the thinner portion and is held in place by the flange being bent over the edge, and a non-combustible pad interposed between the thinner portion of the utensil and the metallic member, preventing material cooked from burning on the bottom thereof.

In testimony whereof I have signed my name to this specification, in the presence of two subscribing witnesses, on this 13th day of August A. D. 1915.

OTTO R. BERGER.

Witnesses:
KENT W. WONNELL,
T. COLSON.